(12) United States Patent (10) Patent No.: US 8,312,450 B2
Gangadharappa et al. (45) Date of Patent: Nov. 13, 2012

(54) WIDGETIZING A WEB-BASED APPLICATION

(75) Inventors: Kiran Gangadharappa, Mountain View, CA (US); Apurv R. Jawle, Fremont, CA (US); Vincent Mendicino, San Mateo, CA (US); Andrew Ng, Fremont, CA (US); Neil Srivatsan, Santa Clara, CA (US); Dirk Wodtke, Soquel, CA (US)

(73) Assignee: SAP AG, Walldorf (DE)

( * ) Notice: Subject to any disclaimer, the term of this patent is extended or adjusted under 35 U.S.C. 154(b) by 651 days.

(21) Appl. No.: 12/338,803

(22) Filed: Dec. 18, 2008

(65) Prior Publication Data

US 2010/0162274 A1 Jun. 24, 2010

(51) Int. Cl.
*G06F 9/445* (2006.01)
(52) U.S. Cl. ........ 717/178; 719/328
(58) Field of Classification Search .......... 719/328; 717/178
See application file for complete search history.

(56) References Cited

U.S. PATENT DOCUMENTS

| | | | | |
|---|---|---|---|---|
| 2003/0016241 | A1* | 1/2003 | Burke | 345/733 |
| 2007/0038934 | A1* | 2/2007 | Fellman | 715/700 |
| 2008/0168367 | A1* | 7/2008 | Chaudhri et al. | 715/764 |
| 2008/0201650 | A1* | 8/2008 | Lemay et al. | 715/763 |
| 2008/0255962 | A1* | 10/2008 | Chang et al. | 705/27 |
| 2008/0307301 | A1* | 12/2008 | Decker et al. | 715/241 |
| 2008/0307308 | A1* | 12/2008 | Sullivan et al. | 715/723 |
| 2009/0199213 | A1* | 8/2009 | Webster et al. | 719/320 |
| 2010/0082736 | A1* | 4/2010 | Sanford et al. | 709/203 |

OTHER PUBLICATIONS netVibes, "How to Open a New Browser Window" (Oct. 10, 2008) [retrieved from http://dev.netvibes.com/doc/uwa/howto/open_popup on Aug. 12, 2011].*
"widget, n.". Oxford Engish Dictionary Online. Jun. 2011. Oxford University Press. [retrieved from http://www.oed.com/view/Entry/228908?redirectedFrom=widget on Aug. 10, 2011].*
Yahoo!, "Konfabulator 4.5 Reference Manual" (Nov. 27, 2007) [retrieved from http://widgets.yahoo.com/static/downloads/WidgetsReference_4.5.zip on Aug. 11, 2011].*
Lee, Wei-Meng, "Professional Windows Vista Gadgets Programming" (Dec. 5, 2007), Wiley Publishing, Inc., pp. 3-20,149-149.*
Wikipedia, "Dashboard (Mac OS)" (Nov. 26, 2008) [retrieved from http://en.wikipedia.org/w/index.php?title=Dashboard_(Mac_OS) &oldid=254268874 on Jan. 30, 2012].*
Webster's Ninth New Collegiate Dictionary, (1991), p. 1348.*
Chambers, M.; Dixon, R.; Swartz, J., "Apollo for Adobe Flex Developers Pocket Guide" (Mar. 2007), O'Reilly Media, Inc., pp. 1-16, 34.*

* cited by examiner

*Primary Examiner* — H. S. Sough
*Assistant Examiner* — Brian Wathen
(74) *Attorney, Agent, or Firm* — Schwegman Lundberg Woesnner P.A.

(57) ABSTRACT

Method and system for widgetizing a web-based application are provided. An example system comprises a widgetizer trigger and a definition module. The widgetizer trigger may be configured to receive at a server computer system, from a web browser application running at a client computer system, a request to widgetize a web-based computer application to permit the computer application to be run as a desktop widget at the client computer system. The definition module may be configured to provide to the client computer application, in response to the request to widgetize, a definition file associated with the computer application, the definition file comprising a reference link to the computer application, the reference link including one or more parameters, the one or more parameters to instruct the computer application to generate output in a format suitable for use by a widget engine provided at the client computer system.

18 Claims, 6 Drawing Sheets

WIDGETIZING A WEB-BASED APPLICATION

TECHNICAL FIELD

This application relates to the field of widgets and specifically a method and system for widgetizing a web-based application.

BACKGROUND

Widgets are mini-applications adapted to allow a user to monitor or interact with certain information provided by a server computer system. Widgets may be described as interactive virtual tools that provide single-purpose services by pulling data from a backend system and presenting this data on the user's display device. Examples of widgets include computer programs such as alarm clocks, local weather information monitors, stock monitors, etc. For example, in a sales company, the Operations Department senior management and analysts may be responsible for carefully tracking the revenue, inventory and open order status in real time. The monitoring is particularly important during the last week of each month. A revenue tracking widget may be utilized in this situation to provide a user with on demand access to up-to-date relevant information, which may reduce or even eliminate the tasks of manually retrieving information numerous times throughout the day and manually extracting one or two key data points in each report.

A widget may be run on an application platform referred to as a widget engine. A widget engine may use, e.g., a JavaScript® runtime environment combined with an Extensible Markup Language (XML) interpreter and may require that a widget is developed according to the requirement of the specific widget engine. Examples of widget engines are Yahoo! ®Widgets and Vista™ Sidebar. Yahoo! ®Widgets is capable of running widgets using a JavaScript® runtime environment and an XML interpreter.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
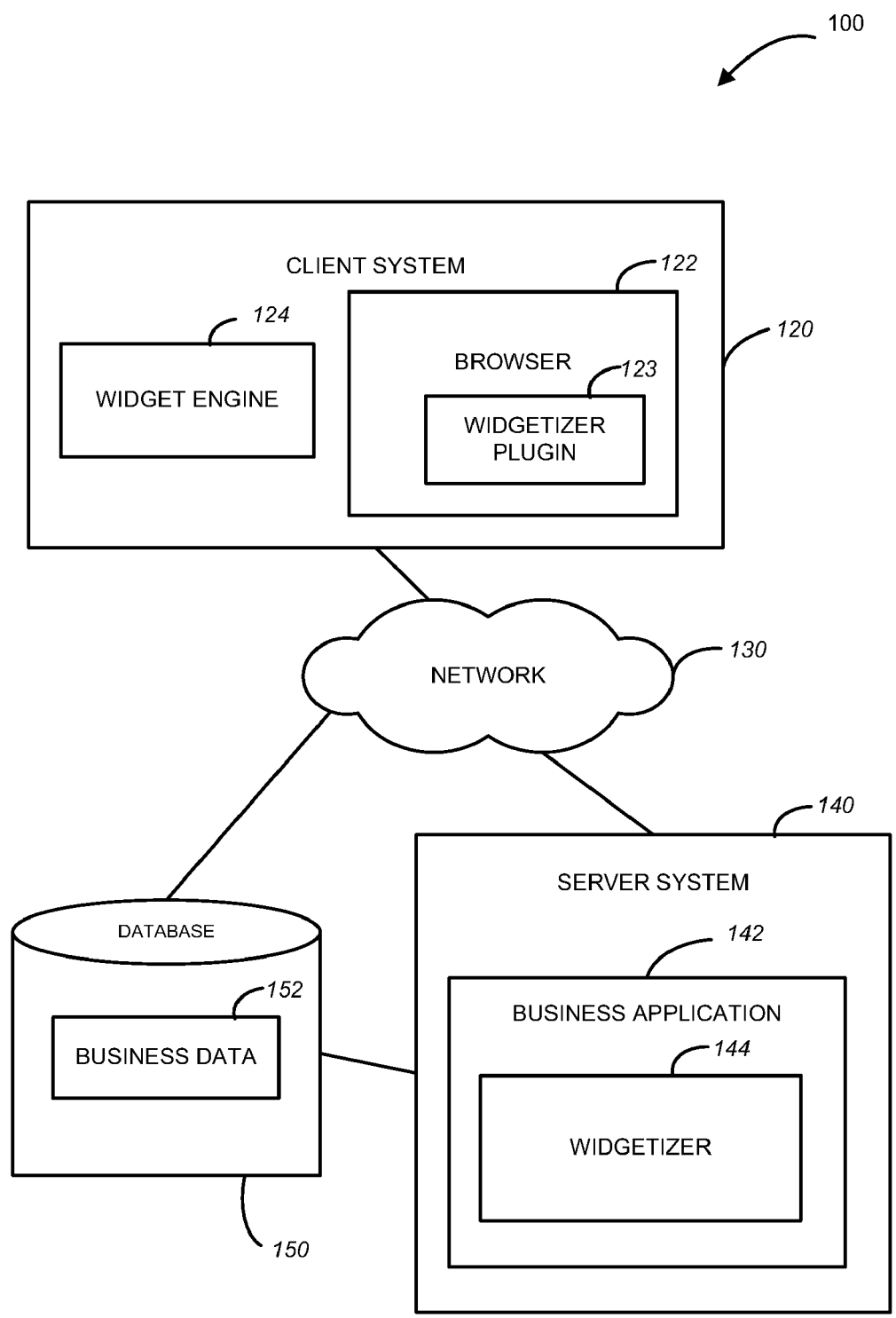
FIG. 1 is a diagrammatic representation of a network environment within which an example system for widgetizing a web-based application may be implemented.

In one example embodiment, a method and system may be provided to convert a web-based computer application or its portion into a module that can be exposed to a widget engine (such as, e.g., Yahoo!® Widgets or a widget engine built using Adobe® AIR™) and utilized by a user as a widget. A process of automatically creating a widget that corresponds to a web-based application or its feature may be referred to as a process of widgetizing. While one approach to creating widgets is to develop an application that conforms to the requirements to a particular widget engine, an example method and system for widgetizing a web-based application may be used to access an existing computer application that have been created without having a widget in mind as a source and expose the existing application through a generic mechanism to a widget engine in a way that the exposed application is recognized and treated by the widget engine the same way as a widget created specifically for use with that widget engine. An example approach of widgetizing a source computer application that was originally developed in a programming language that is not specific to a widget engine may shield application developers from the specifics of particular widget engines and may permit the source computer applications to be developed in a manner independent of any proprietary widget engine offerings.

In one example embodiment, a source computer application may be developed in a platform-independent language, such as Java™, and include a deployment option that indicates whether the source computer application may be externalized as a widget. The source computer application may be configured to permit a user to access its features through a web portal and to request that the application is widgetized by converting it into a widget. When a request to widgetize a source computer application is received by the backend (e.g., at a Java™ application server) from a client computer system, a component associated with the source computer application (e.g., a Java™ wrapper designed to accommodate operations needed for widgetizing, which thus may be referred to as a widgetizer) generates a so-called definition file and downloads it to the client computer system. The definition file contains a reference link to the source computer application running on the application server. The widget engine may use information that is present in the definition file to connect to the application server that hosts the source computer application. The reference link may have configuration parameters directing the source computer application to produce XML or Extensible Business Client Markup Language (xBCML) output that includes screen definitions, as well as data and events information that is consumed by the widget engine in order to permit the source computer application to run as a desktop widget.

In one example embodiment, a widget engine may be developed using Adobe® AIR™. Adobe® AIR™ is a cross-operating system runtime that allows development of rich Internet applications using HyperText Markup Language (HTML)/Ajax, Flex, or Flash and to deploy these applications to the desktop. Adobe® AIR™ applications support native desktop integration, including clipboard and drag-and-drop support, local file input/output (I/O), system notification, etc. Adobe® Flex is a collection of technologies released by Adobe® Systems for the development and deployment of cross-platform rich Internet applications based on the proprietary Adobe® Flash platform. This AIR™-based widget engine may be configured to render xBCML as Flex/Flash controls that are characterized by having rich look and feel.

Using a concrete example, a business application running, e.g., on a Java™ application server, may produce HTML output that can be provided to a client computer and rendered by a web browser application (or simply browser) hosted by the client computer. A user accessing the business application via the browser may utilize thus presented user interface to request that a particular component of the business application is converted into a widget. For example, a user may wish to convert into a widget a "Sales Monitor" component of a business application, because a "Sales Monitor" widget would present sales data in a rich format and periodically update the presented data without the need to invoke a web browser application or the need to manually request the updated information. In one embodiment, the user may activate a "Widgetize" control, which may be implemented as a browser plug-in, to cause a request to be sent to the server hosting the business application. The server, in response, engages the business application determines a definition file associated with the "Sales Monitor," and downloads it to the requesting client system. The definition file is then stored on the client, and the user may activate the newly created widget and be able to access up-to-date sales information without navigating a web portal associated with the business application or searching the bookmarks. A generic communication mechanism between the backend and the widget engine installed on the client computer system obtains business application data (sales data in this example) from the business application and feeds this data into the widget engine. The widget engine extracts the relevant sales information and renders it in a rich format. The widgetized "Sales Monitor" has the look and feel of a native widget. From within the "Sales Monitor" widget, a user may be permitted to navigate to the web portal of the associated web-based business application. In one example embodiment, the feature of navigation from a widget to the associated web-based computer application is implemented by storing the relevant metadata (e.g., the name of a widget, initial screen position of the widget, a user's name and password) along with the widget location information during the stage where a web-based application is widgetized.

An example system for widgetizing a web-based application may be implemented in the context of a network environment 100 illustrated in FIG. 1. As shown in FIG. 1, the network environment 100 may include a client computer system 120 (also referred to as a client system or a client) and a server computer system 140 (also referred to as a server system or a server). The server system 140, in one example embodiment, may host a widgetizer 144, which, in turn, may be part of a larger computerized business platform. The client system 120 may host a web browser application 122 and may have access to the business application 142 hosted by the server system 140 via a communications network 130. The communications network 130 may be a public network (e.g., the Internet, a wireless network, etc.) or a private network (e.g., a local area network (LAN), a wide area network (WAN), Intranet, etc.).

As shown in FIG. 1, the server system is in communication with a database 150. The database 150 may store business data 152 that may be utilized by the business application 142 and also may be provided to the client system 120. The business application 142 may be a web-based application and thus may be configured to generate HTML output suitable for rendering by the web browser application 122.

The business application 142, in one example embodiment may be configured to include (or to cooperate with) a computer module capable of converting a web-based computer application into a desk top application that can be run by a widget engine service provided with an associated client computer system (a desktop widget). As mentioned above, a module configured to convert a web-based application into a widget may be referred to as a widgetizer module or merely a widgetizer. Shown in FIG. 1 is a widgetizer 144 associated with the business application 142. The widgetizer 144 may be configured to process messages from the client system 120 in order to permit a user to run the business application 142 as a desktop widget on the client system 120.

As mentioned above, the widgetizer may be responsible for providing to the client system 120 a definition file that includes a reference link to the business application 142, as well as parameters to control the output of the business application 142 referred to as output parameters. The reference link may be provided, e.g., in the form of a Uniform Resource Locator (URL). The output parameters (or a single output parameter), when provided to the business application 142, may indicate to the business application 142 that the output generated by the business application 142 is to be in a format suitable for processing by the widget engine 124 hosted by the client system 120. For example, where the widget engine 124 is built using Adobe® AIR™, the acceptable format of an output generated by the business application 142 may be XML format or xBCML format. Thus, in one example embodiment, the business application 142 may be configured to switch between generating HTML output to be rendered by the web browser application 122 and generating output in xBCML format to be consumed by the widget engine 124 in order to render business application data via the desktop widget corresponding to the business application 142.

As shown in FIG. 1, the web browser application 122 may include a widgetizer plug-in 123 that may be provided to facilitate requests to widgetize web-based applications. In a scenario where a web browser application is not supplied with a widgetizer plug-in, a web-based application running in the browser 122 may be provided with a control (e.g., an icon or a menu selection displayed on the associated web page) that may be used to send to the source business application 142 a request to invoke the associated widgetizer 144 and to generate an associated widget. Some components of an example business application serving as a source computer application in the process of widgeting are illustrated in FIG. 2.

Figure 2:
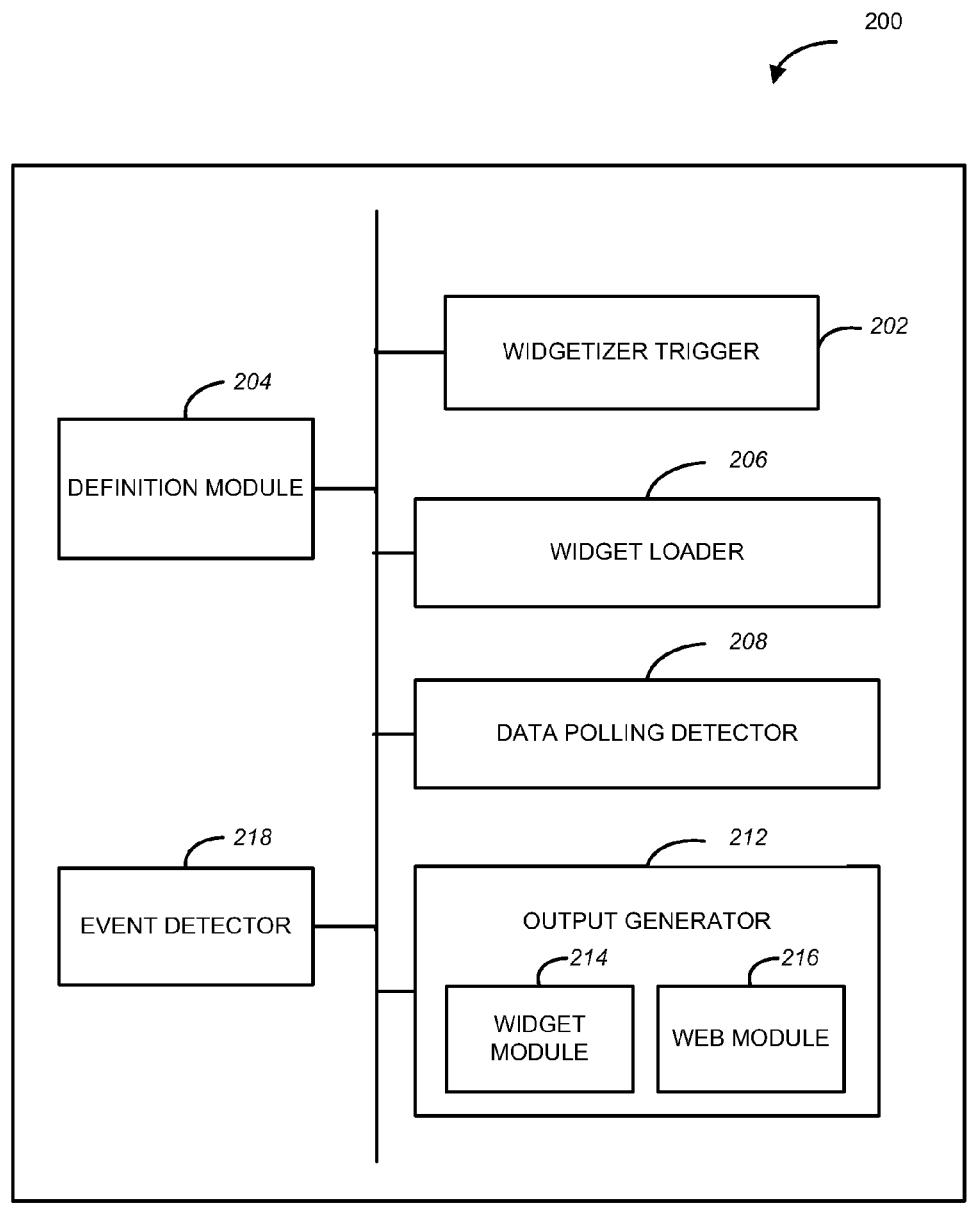
FIG. 2 is block diagram of a system for widgetizing a web-based application, in accordance with one example embodiment.

FIG. 2 is a block diagram of a system 200 for widgetizing a web-based application, in accordance with one example embodiment. The system 200 includes modules provided or cooperating with the business application 122 of FIG. 1. A combination of some of these modules, such as modules that trigger the process of widgetizing or generating a definition file may be referred to collectively as a widgetizer. It will be noted, that while FIGS. 1 and 2 refer to a business application and business data, the techniques described herein to permit the use of a web-based application as a desktop widget may be utilized beneficially with web-based applications that serve purposes other than providing business data.

As shown in FIG. 2, the system 200 includes a widgetizer trigger 202 and a definition module 204. The widgetizer trigger may be configured to detect a request to widgetize a web-based computer application. As mentioned above, this request may originate from the web browser application 122 running on the client system 120 of FIG. 1 and may be issued by engaging an associated widgetizer plug-in or by activating a predetermined control from as associated web page. The definition module 204 may be configured to determine a definition file that may be used by the widget engine 124 at the client computer system 120 to facilitate access to the business application 142 (that may also be referred to as the source computer application) hosted at the server system 140. The definition module 204 may create a definition file for the source computer application or, if the definition file has already been provided, access the definition file and send it to the client system 120. A definition file, in one example embodiment, may include a reference link to the source computer application, as well an one or more parameters, e.g., a user's name and password. The definition file may be thus sent to the client system 120, stored at a location accessible to the widget engine 124, and may be used by the widget engine 124 to poll the source computer application for data that may then be displayed by the desktop widget corresponding to the business application 142.

The system 200 also includes, as shown in FIG. 2, a widget loader 206, a data polling detector 208, and an output generator 212. The widget loader 206 may be configured to detect a request from the client system 120 to load the widget created as a result of widgetizing the business application 142. In response to such request, the widget loader 206 may cause the widget engine 124 to be instantiated at the client system 120, after which the widget engine 124 may use the definition file to access the business application 142 and obtain screen definitions and data to be presented by the widget running on the client system 120. The data polling detector 208 may be configured to detect a request for data from the widget engine 124. The output generator 212 may be configured to respond to requests for data from the client 120 by generating the output in a format according to the request. For example, a request for data from the widget engine 124 may include a widget indicator, directing the source computer application to generate output in a format suitable for processing by the widget engine 124. The output generator 212, in one example embodiment, may also be capable of generating HTML output, e.g., in response to a request associated with a web indicator. The output generator 212 may include a widget module 214 to detect a widget indicator and a web module 216 to detect a web indicator.

Another module of the system 200 shown in FIG. 2 is an event detector 218. The event detector 218 may be configured to receive events from the widget engine 124. In response to the receiving of an event associated with a widget, the event detector 218 may update the state of the source computer application associated with the widget.

It will be noted, that while FIG. 2 shows particular modules as part of another component (e.g., the widget module 214 and the web module 216 being part of the output generator 216), other embodiments may be provided where some modules of the system 200 shown as separate components are implemented as a single module. Conversely, embodiments may be provided where a component that is shown in FIG. 2 as a single module may be implemented as two or more components. Example operations performed by the system for widgetizing a web-based computer application may be described with reference to FIG. 3.

Figure 3:
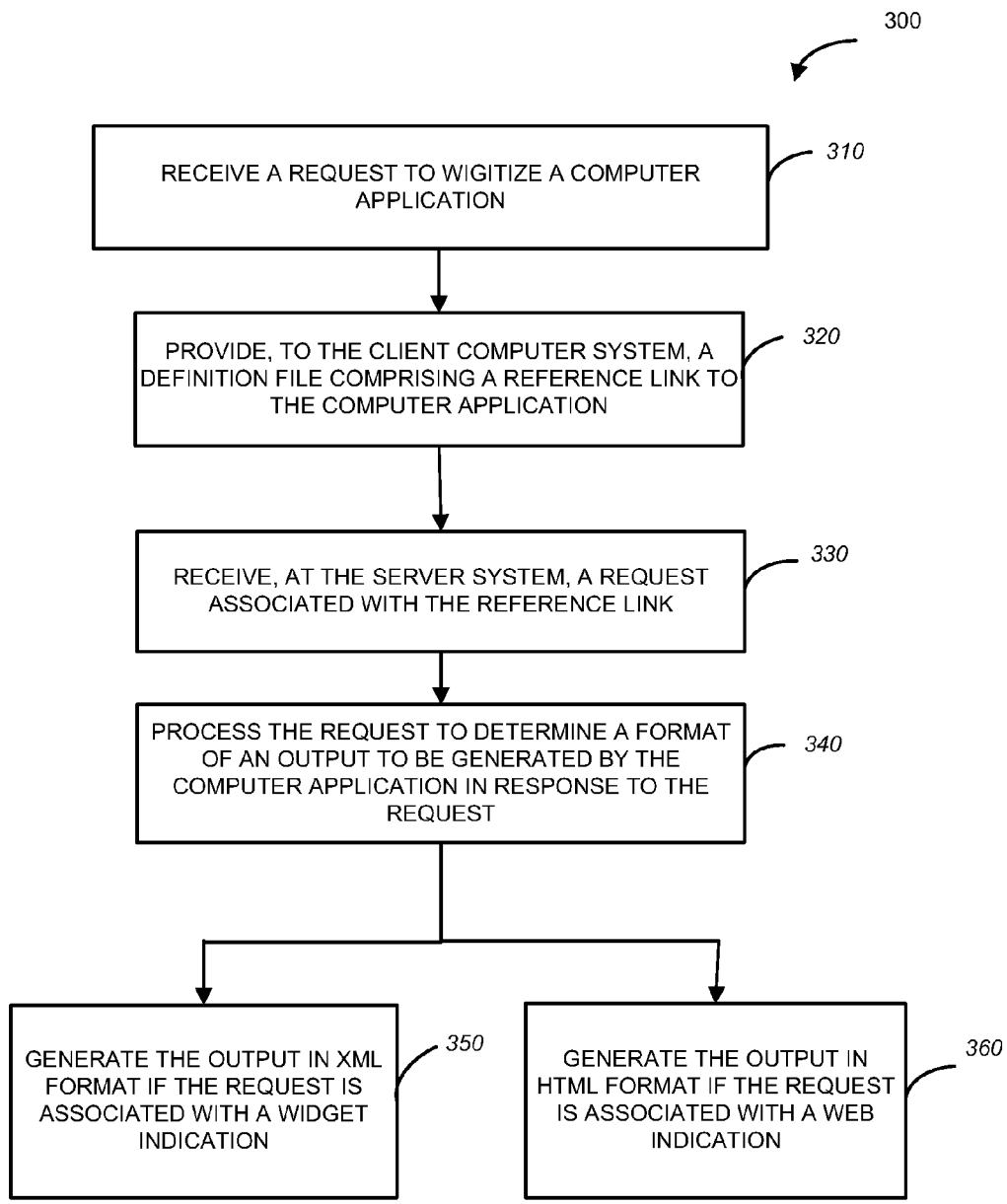
FIG. 3 is a flow chart of a method for widgetizing a web-based application, in accordance with an example embodiment.

FIG. 3 is a flow chart of a method 300 to widgetize a web-based computer application, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system for widgetizing a web-based computer application shown in FIG. 2.

As shown in FIG. 3, the method 300 commences at operation 310, where the widgetizer trigger 202 of FIG. 2 receives, from the client computer system 120 of FIG. 1, a request to widgetize a computer application (e.g., the business application 142). At operation 320, the definition module 204 of FIG. 2 determines a definition file associated with the business application 142 and provides it to the client computer system 120 for use by the widget engine 124. As mentioned above, the definition file includes a reference link associated with the business application 142 and one or more parameters. At operation 330, the data polling detector 208 of FIG. 2 receives, from the widget engine 124, a request for data associated with the reference link included in the definition file. The request for data is processed, e.g., by a parser provided with the system 200 of FIG. 2, to determine a format of an output to be generated by the business application 142 in response to the request for data. At operation 350, the output is generated in XML or xBCML format (assuming the widget engine 124 is built using Adobe® AIR™) in response to determining that the request for data is associated with a widget indication. If the request for data is associated with a web indication, the output is generated in HTML format, at operation 360.

Figure 4:
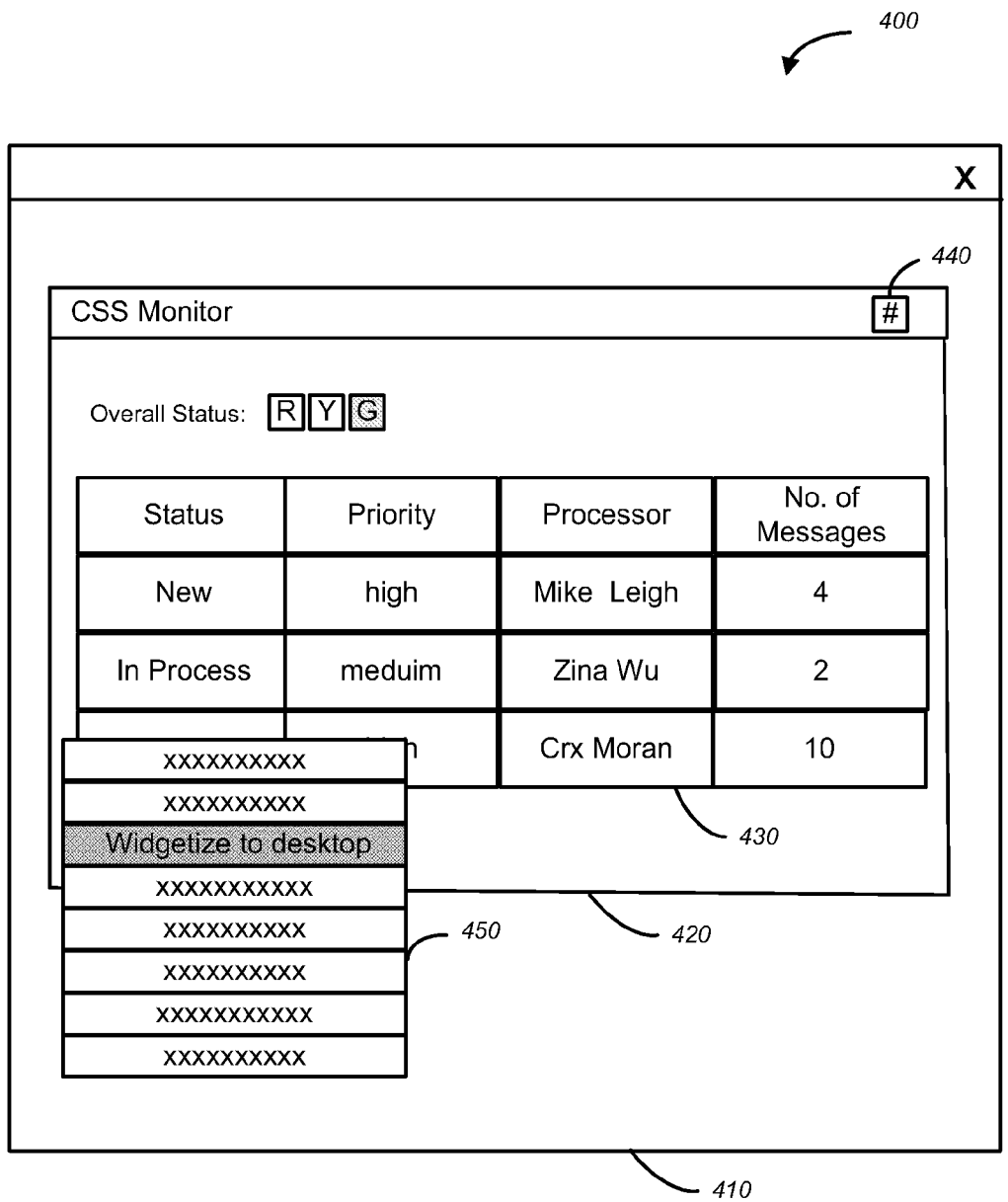
FIG. 4 is an example user interface illustrating a request to widgetize a CSS Monitor application to a user's desktop, in accordance with an example embodiment.

FIG. 4 is an example user interface 400 illustrating a request to widgetize a Customer Service System (CSS) Monitor application to a user's desktop, in accordance with an example embodiment. In FIG. 4, area 410 represents a web browser window, displaying a CSS monitor web page 420. The CSS Monitor web page 420 displays a table 430 that shows customer service requests data, as well as an overall status indicator in the upper right corner of the web page 420. A request to widgetize CSS Monitor may be triggered by clicking on the "Convert to widget" icon 440 or, if a widgetizer plug-in has been installed at the associated web browser application, by invoking application context menu 450 and selecting an appropriate option. A view of the resulting CSS Monitor widget may be described with reference to FIG. 5.

Figure 5:
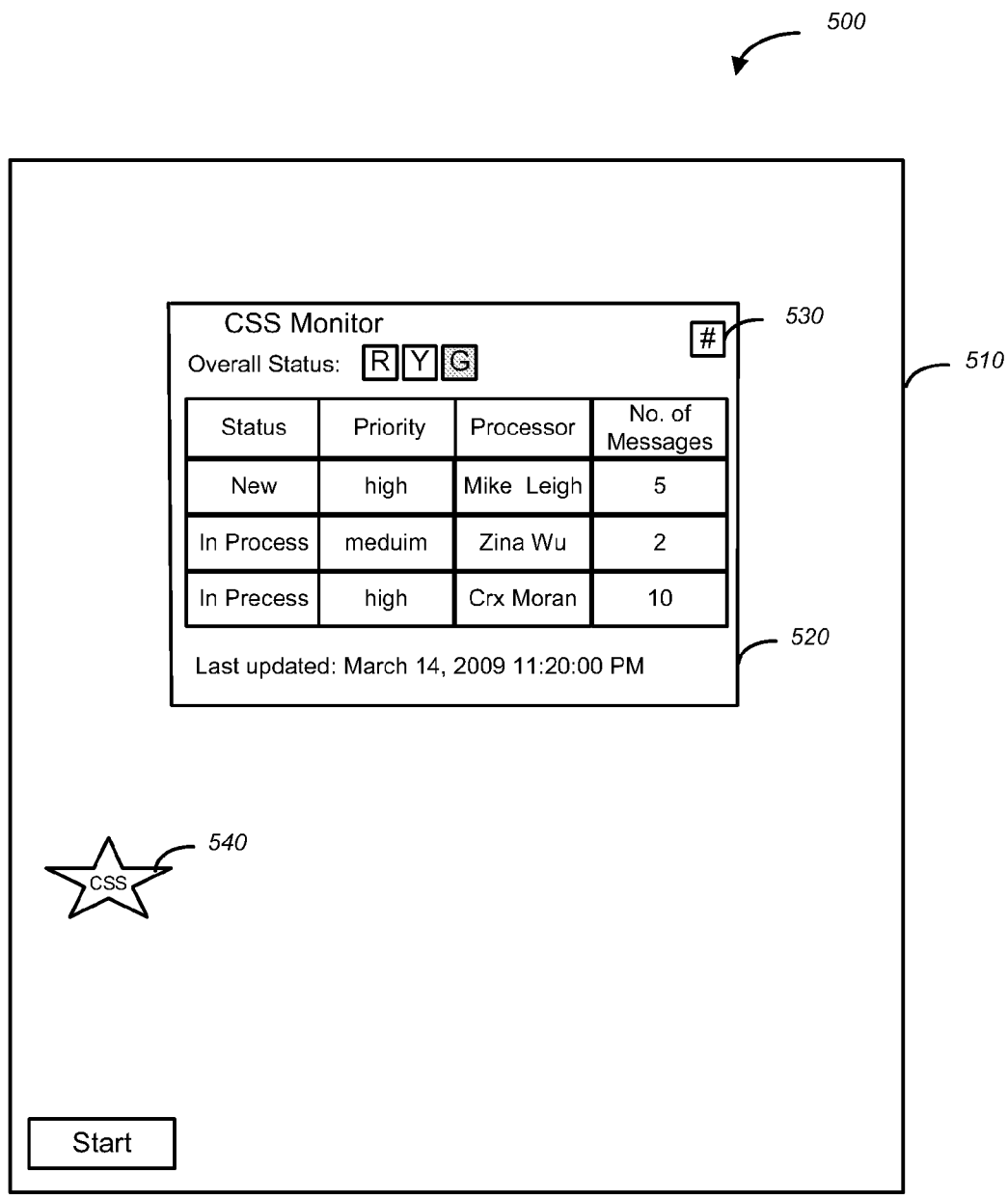
FIG. 5 is an example user interface illustrating a CSS Monitor application running on a user's desktop, in accordance with an example embodiment.

FIG. 5 is an example user interface 500 illustrating a CSS Monitor application running on a user's desktop, in accordance with an example embodiment. In FIG. 5, area 510 represents a desktop area accessible by a user of the client system 120 of FIG. 1. Shown as area 520 is a newly created CSS Monitor widget that can be instantiated by engaging a CSS icon 540. CSS Monitor data displayed in the area 520 is periodically updated, such that the user does not need to perform a refresh action or navigate to a particular web site. The CCS Monitor widget may be provided with a control 530 to permit a user to navigate to the corresponding web-based version of the CSS Monitor.

Figure 6:
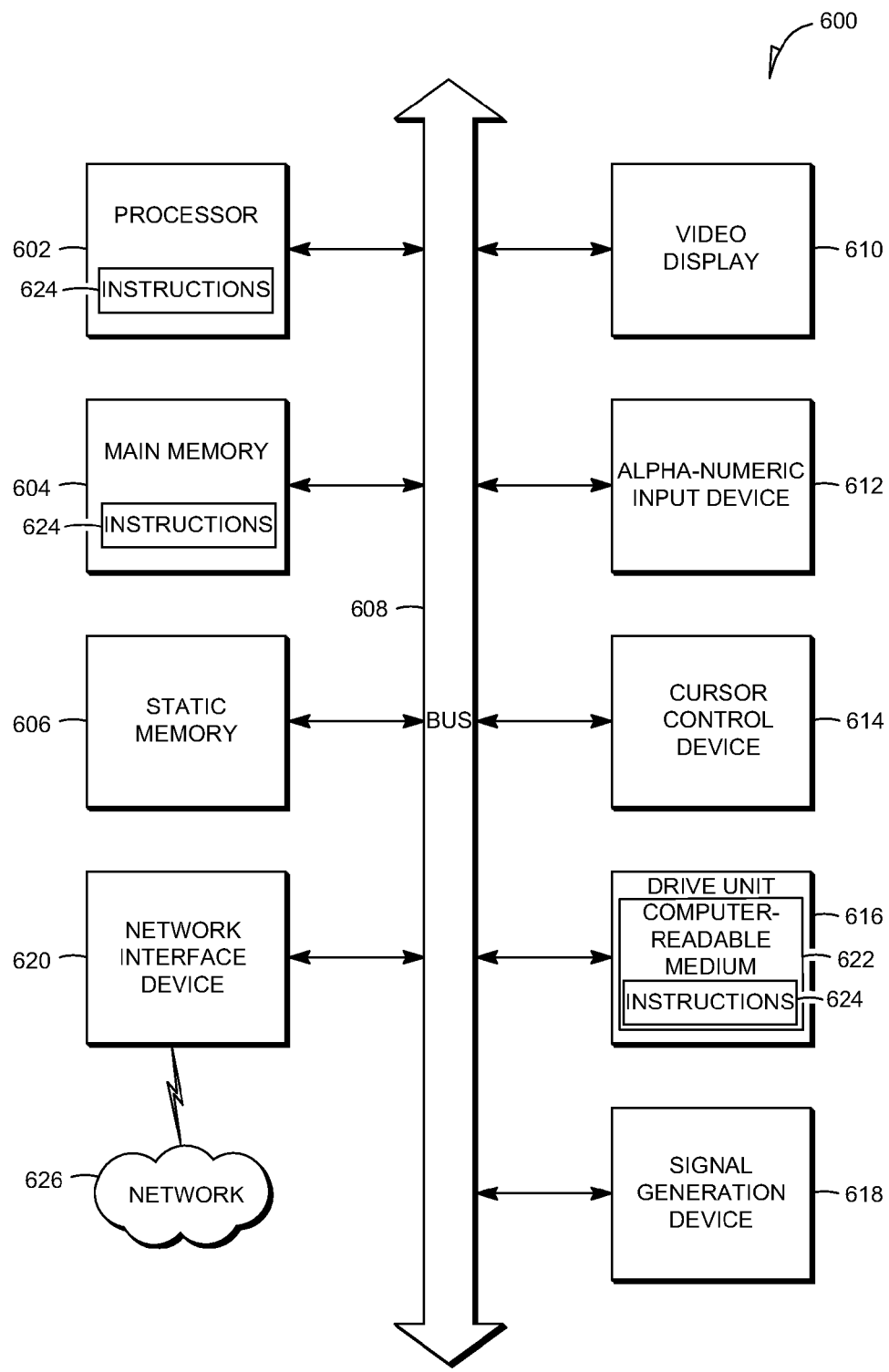
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 613 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, method and system for widgetizing a web-based application have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. For example, while an embodiment has been described with reference to a business application, a system to widgetize a web-based application may be implemented and utilized advantageously in the context of various other computer applications.

The invention claimed is:

1. A computer-implemented system comprising:
   at least one processor coupled to a memory;
   a web-based computer application executing at a server computer system, the web-based computer application configured to switch between generating output to be rendered by a web browser application executing at a client computer system and generating output in a format suitable for use by a widget engine provided at the client computer system;
   a widgetizer trigger, implemented as a software module, using the at least one processor, to receive at the server computer system, from a web browser application running at a client computer system, a request to widgetize the web-based computer application to permit the computer application to be run as a desktop widget at the client computer system; and
   a definition module to provide to the client computer system, in response to the request to widgetize, using the at least one processor, a definition file associated with the web-based computer application, the definition file comprising a reference link to the web-based computer application, the reference link including one or more parameters, the one or more parameters to instruct the web-based computer application to generate output in the format suitable for use by the widget engine provided at the client computer system.

2. The system of claim 1, comprising:
   a data polling detector to receive, at the server computer system, a request for data associated with the computer application; and
   an output generator to respond to the request for data by generating an output in the format suitable for use by a widget engine provided at the client computer system and providing the output to the client computer system.

3. The system of claim 2, wherein the output generator comprises a widget component to generate an output suitable for use by a widget engine available at the client computer system, in response to detecting a widget indicator associated with the request for data from the client computer system.

4. The system of claim 2, wherein the output suitable for use by the widget engine is in XML format.

5. The system of claim 2, wherein the output generator comprises a web component to generate an output suitable for rendering by a web browser in response to detecting a web indicator associated with the request for data from the client computer system.

6. The system of claim 1, wherein the request to widgetize the computer application is associated with a web browser plug-in running on the client application.

7. The system of claim 1, wherein the computer application is associated with a component of a computerized business platform hosted by the server computer system.

8. The system of claim 1, comprising an event detector to:
   receive, from the widget engine, an event indicator associated with the desktop widget; and
   update a state of the computer application running on the server computer system in response to the event indicator.

9. The system of claim 1, configured to:
   detect a navigation request, from a widget engine running on the client computer system, to navigate to a web portal provided by a computer application associated with the desktop widget;
   cause a web browser to be instantiated at the client computer system; and
   cause a web page associated with the web portal to be provided to the web browser.

10. A computer-implemented method comprising:
    using one or more processors to perform operations of:
    executing at a server computer system a web-based computer application the web-based computer application configured to switch between generating output to be rendered by a web browser application executing at a client computer system and generating output in a format suitable for use by a widget engine provided at the client computer system;
    receiving at the server computer system, from the web browser application executing at the client computer system, a request to widgetize the web-based computer application to permit the web-based computer application to be run as a desktop widget at the client computer system; and providing to the client computer system, in response to the request to widgetize, using the at least one processor, a definition file associated with the web-based computer application, the definition file comprising a reference link to the web-based computer application, the reference link including one or more parameters, the one or more parameters to instruct the web-based computer application to generate output in the format suitable for use by the widget engine provided at the client computer system.

11. The method of claim 10, comprising:
receiving, at the server computer system, a request for data associated with the computer application; and
responding to the request for data by generating an output in the format suitable for use by a widget engine provided at the client computer system and providing the output to the client computer system.

12. The method of claim 11, comprising:
receiving a request for data from the widget engine provided at the client computer system; and
generating an output suitable for use by the widget engine, in response to detecting a widget indication associated with the request for data.

13. The method of claim 10, wherein the output suitable for use by the widget engine is in XML format.

14. The method of claim 10, comprising:
receiving a request for data from a web browser provided at the client computer system; and
generating HTML output in response to the request for data from the web browser.

15. The method of claim 10, wherein the request to widgetize the computer application is associated with a web browser plug-in running on the client application.

16. The method of claim 10, wherein the computer application is associated with a component of a computerized business platform hosted by the server computer system.

17. The method of claim 10, comprising:
receiving, from the widget engine, an event indicator associated with the desktop widget; and
updating a state of the computer application running on the server computer system in response to the event indicator.

18. A machine-readable non-transitory storage medium having instruction data to cause a machine to:
executing at a server computer system a web-based computer application, the web-based computer application configured to switch between generating output to be rendered by a web browser application executing at a client computer system and generating output in a format suitable for use by a widget engine provided at the client computer system;
receive at the server computer system, from a web browser application running at the client computer system, a request to widgetize a web-based computer application to permit the web-based computer application to be run as a desktop widget at the client computer system; and
provide to the client computer system, in response to the request to widgetize, using the at least one processor, a definition file associated with the web-based computer application, the definition file comprising a reference link to the web-based computer application, the reference link including one or more parameters, the one or more parameters to instruct the web-based computer application to generate output in the format suitable for use by the widget engine provided at the client computer system.

* * * * *